United States Patent
Foreman

(10) Patent No.: US 10,719,881 B2
(45) Date of Patent: Jul. 21, 2020

(54) SUBSCRIPTION HEALTHCARE COVERAGE SYSTEM AND METHOD

(71) Applicant: Derek Foreman, Lafayette, LA (US)

(72) Inventor: Derek Foreman, Lafayette, LA (US)

( * ) Notice: Subject to any disclaimer, the term of this patent is extended or adjusted under 35 U.S.C. 154(b) by 310 days.

(21) Appl. No.: 15/849,082

(22) Filed: Dec. 20, 2017

(65) Prior Publication Data

US 2019/0188798 A1 Jun. 20, 2019

(51) Int. Cl.
- *G06Q 40/00* (2012.01)
- *G06Q 40/08* (2012.01)
- *G06Q 30/02* (2012.01)
- *G06Q 10/10* (2012.01)

(52) U.S. Cl.
CPC ......... *G06Q 40/08* (2013.01); *G06Q 10/1095* (2013.01); *G06Q 30/0282* (2013.01); *G06Q 40/00* (2013.01)

(58) Field of Classification Search
CPC .............................. G06Q 40/00; G06Q 40/08
See application file for complete search history.

(56) References Cited

U.S. PATENT DOCUMENTS

| | | | |
|---|---|---|---|
| 6,208,973 B1 * | 3/2001 | Boyer | G06Q 40/00 705/4 |
| 7,346,522 B1 | 3/2008 | Baylor et al. | |
| 7,590,550 B2 | 9/2009 | Schoenberg | |
| 8,560,338 B2 | 10/2013 | Kalies, Jr. | |
| 8,655,776 B2 * | 2/2014 | Cheung | G06Q 40/00 705/35 |
| 8,787,555 B2 | 7/2014 | Gonen et al. | |
| 2002/0082875 A1 * | 6/2002 | Best-Devereux | G06Q 40/00 705/4 |
| 2003/0154104 A1 | 8/2003 | Koningsberg | |
| 2011/0251851 A1 | 10/2011 | Van Lierde et al. | |
| 2013/0304618 A1 * | 11/2013 | Mastrogiovanni | G06Q 40/00 705/35 |
| 2014/0019160 A1 | 1/2014 | Loya, III | |
| 2014/0039911 A1 | 2/2014 | Iyer | |

OTHER PUBLICATIONS

Birny Birnbaum, Overview of Lender-Place Insurance Products, Markets and Issues, Jun. 13, 2013, Birny Birnbaum Consulting, Inc., web edition, 1-35 (Year: 2013).*

* cited by examiner

*Primary Examiner* — I Jung Liu

(74) *Attorney, Agent, or Firm* — Keaty Law Firm LLC

(57) ABSTRACT

A subscription healthcare coverage system and method providing lower-cost and less-complex healthcare coverage for individuals, including employees of businesses, having flat initial fees, business-provided discounts, adjustments of fees upon renewal based on past use, secure direct instant communications with covered individuals, businesses, and healthcare providers through common electronic devices, accumulation of data in a secure, quickly-accessible form, and administration based on the application of defined rules to accumulated data.

20 Claims, 4 Drawing Sheets

SUBSCRIPTION HEALTHCARE COVERAGE SYSTEM AND METHOD

BACKGROUND

This invention provides a subscription healthcare coverage system and method.

The costs of healthcare are high and are still rising, and a substantial reason for that rise is the profound expenses of administration of healthcare provision, utilization, and payments. The present administrative systems of administrative hurdles not only drive up the cost of healthcare, but can also be prohibitively confusing to patients in need of healthcare, sometimes being so confusing that the policies discourage or prevent a patient's access to healthcare.

There is therefore a need for a subscription healthcare coverage system and method that provides direct, secure communications with covered individuals and simplified administration based on flat rates, as well as automatic, fast decision-making based upon secure, quickly accessible data captured and stored in the system. The prior art does not presently provide for such a solution.

For example, U.S. Pat. No. 7,590,550 was issued to assignee American Well Inc. on Sep. 15, 2009, covering "Connecting Consumers with Service Providers." The concept, invented by Roy Schoenberg, provides for a system wherein a request is first received from a consumer of services to consult with a service provider. The service provider has a service provider profile that satisfies at least some attributes in a set of attributes that define a suitable service provider. An available service provider satisfying at least some of those attributes of the confirmed set of attributes is identified, and then a communication is established between the consumer of services and the identified service provider, via a communication channel provided in the system. A general schematic of the system provides for appropriate connections between the set of clients and appropriate tracking, access, and scheduling server.

U.S. Publication No. 2014/0019160, published by inventors Francisco Loya, III, et al. on Jan. 16, 2014, discloses "Verifying Charge Codes." Per the disclosure of the Loya publication, systems, methods, and computer program products involve receiving, electronically, medical information about a patient of a medical provider from an electronic medical record. A charge code associated with a medical condition of the patient can be automatically identified from a specified set of a plurality of charge codes upon which a third party will base payment to the medical provider, using the received medical information. The charge code can be outputted. In the system, after charge does are verified, they can be stored in a repository for other analyses. For example, utilization models can be generated based on charge codes identified. An example utilization model may include identifying Diagnostic Related Groups ("DRG") that are paid for under a flat fee model. The actual costs associated with the DRG can be determined based on certain metrics that can be accumulated and analyzed. The actual costs can be compared against the flat fees collected to determine net gains and losses, efficiency of certain treatments, and so forth. The metrics and the DRGs can additionally be tracked using charge codes identified from physician reports and from other medical information for each patient. The Loya system is owned by assignee CMO RX Inc.

U.S. Publication No. 2003/0154104 was published by Alvin Koningsberg on Aug. 14, 2003, disclosing a "Method of Operating a Savings Plan for Health Care Services." In the Koningsberg platform, a health care services savings plan highlights a savings. Data is entered, published, and updated on the plan owner's advertised web site, identifying provider entities per specialty, their regular and discounted price for each treatment type, and the service fee percentage charged by the plan. Users access the data, select the health care provider, present plan cards to the selected entities, and receive health care. The plan bills the user the regular price, issues a credit for the savings difference, with the bills separate for administration, and charges debit calculated by applying a published service fee percentage of between twenty-five and thirty-three percent to the savings difference. Electronic billing triggered is when the health care provider bills the plan by computer, and the plan electronically bills the consumer's credit card. Lastly, a prescription patient profile database is maintained and updated by a data source, with the data source including information about all prescription medication of the health care consumer.

U.S. Pat. No. 8,787,555, issued on Jul. 22, 2014 to assignee Telethrive, Inc., covers a "Process for Obtaining Expert Advice On-Demand." The process of obtaining expert device on-demand, conceived by inventors Shlomo Gonen, Jonathan A. Conen, David Gonen, Darren Berkovitz, Stacy Stubblefield, Micah Grossman, and Jordan Michaels, includes maintaining a substantially real-time list of available experts in selected fields in an electronic database. The system receives a request from a customer for expert advice in one or more of the selected fields maintained in this database. The system then electronically identifies one or more available experts to the consumer in response to the request received, and routes the request for expert advice to at least one of the available experts. The system also provides the capability for the provider to create a profile, which in turn allows requestors to view personal information regarding the provider. Requestors may therefore make better informed decisions when selecting a provider from whom to obtain expert advice on-demand. Preferably, the profile would include 1851 information like age, gender, birthday, interests, personality traits, professional accolades, and the like. The provider contact information and corresponding profile would be submitted for administrator approval before being posted publicly Like providers, requestors may also register with the system via the same or similar process, and would include, for example, inputting contact information such as name, address, telephone number, and geographic location.

U.S. Publication No. 2011/0251851 was published by Carl Van Lierde et al. on Oct. 13, 2011, and discloses a "System and Method for Multi-Person and Multi-Site, Interactive Treatment Simulation." The system and method allow for interactive simulation of a dental treatment. Over a communications network, the system allows a group of dental specialists to provide advice on dental treatment to be administered on a patient by a dentist. Treatment can be simulated by treatment simulation software. An advantage of the system is that any number of specialists can be brought in to instruct the dentist via treatment simulations while the dentist can focus on administering the treatment. In the system, general practitioners ("GPs") can choose to work without or with one or more service providers for each step, and those service providers may be identical for more than one step. To indicate the desired services and to identify preferential experts, the GP would provide input to the system, which can be done by, for example, filling out an online form. Preferences per GP can additionally be stored in the system. Via a webpage, the GP can indirectly access the system's database of service providers to make a choice. The system provides functionality, such as queries, to limit the subset of service providers per step, based on one or more criteria. The system may further assist the GP by proposing a team of experts to conduct the entire set of tasks based on certain criteria, such as shortest overall lead time, smallest number of experts involved, least expensive solution, best qualifications, and so forth. The Lierde et al. publication is owned by DENTSPLY International Inc., as the assignee of record of the application.

U.S. Pat. No. 7,346,522 was issued on Mar. 18, 2008 to assignee First Access, Inc., covering a "Medical Payment System". The payment system, invented by Dorothy M. Baylor and Kimberly A. Darling, allows for a provider of medical goods and/or services to submit, via telephone or other communications medium, a request for a payment amount determination for a patient encounter. A price determination system determines which of a plurality of fee schedules negotiated by the provider applies to the patient encounter and calculates, based at least in part on information entered by the provider, a payment amount for the encounter, which is then communicated to the provider. In one embodiment, the provider receives the payment amount information while the patient is at the point of service. In another embodiment, the provider may use the system to submit a claim for payment by at least one responsible party.

U.S. Pat. No. 8,560,338, issued on Oct. 15, 2013 to assignee TAG, LLC, covers a "Method for Competitive Prescription Drug and/or Bidding Service Provider Selection." In '338 patent, invented by Ralph F. Kalies, Jr., unfilled prescriptions are submitted to a registry comprised of pre-qualified pharmacies for a "reverse auction," in which the pharmacies bid for the opportunity to fill the prescription. The pharmacies are allowed to bid based on price and/or offering ancillary services. The auction may also be used to bid on supplying specified cognitive services. The method may also include obtaining cost comparisons with generic substitutes or similar alternative pharmaceutical products, and the system may further comprise automatically requesting a review by the prescriber for a list of similar substitutes or prior-authorization for third party payers. The winner of the reverse auction is ultimately selected by the customer.

U.S. Publication No. 2014/039911 was published on Feb. 6, 2014 by Sriram Iyer and discloses a "System and Method of Comparing Healthcare Costs, Finding Providers, and Managing Prescribed Treatments." The publication discusses the use of a medical savings management system, device, and method that features a computing device configured to manage medical savings, including drug therapies, to reduce healthcare costs. Users identify medications and other treatments, determine acceptable alternatives, and identify local health care providers. Users can additionally compare costs of the identified treatments from particular local providers based upon contracted discounts, manufacturer rebates, and the availability of lower cost clinical alternatives. Based on the identified treatments, health care providers, and costs, users select a preferred treatment and provider and reduce the cost of a treatment. Additional savings may be realized by searching a larger radius for lower cost providers, and by sharing discount cards via e-mail, text messaging, and social media outlets. Users benefit from the savings and generate revenue for sponsors of the discount programs, and the system is integrated with credit, debit, and Health Flex cards to facilitate payment and reimbursement for eligible health expenses.

There is therefore a need for a subscription healthcare coverage system that provides direct, secure communications with covered individuals, and further provides for simplified administration via flat rate fees, as well as automatic, fast decision-making based on secure, quickly accessible data captured and stored on the system.

SUMMARY OF THE INVENTION

This invention provides a subscription healthcare coverage system and method, providing lower-cost and less-complex healthcare coverage for individuals, including employees of businesses, having flat initial fees, business-provided discounts, and adjustments of fees upon renewal based on past use, as well as secure, direct, instant communications with covered individuals, businesses, and healthcare providers through common electronic devices such as personal computers, tablets, and smartphones, with accumulation of data in a secure, quickly accessible form, and administration based on the application of defined rules to accumulated data.

BRIEF DESCRIPTION OF DRAWINGS

Reference will now be made to the drawings, wherein like parts are designated by like numerals, and wherein.

DETAILED DESCRIPTION OF THE INVENTION

Figure 1:
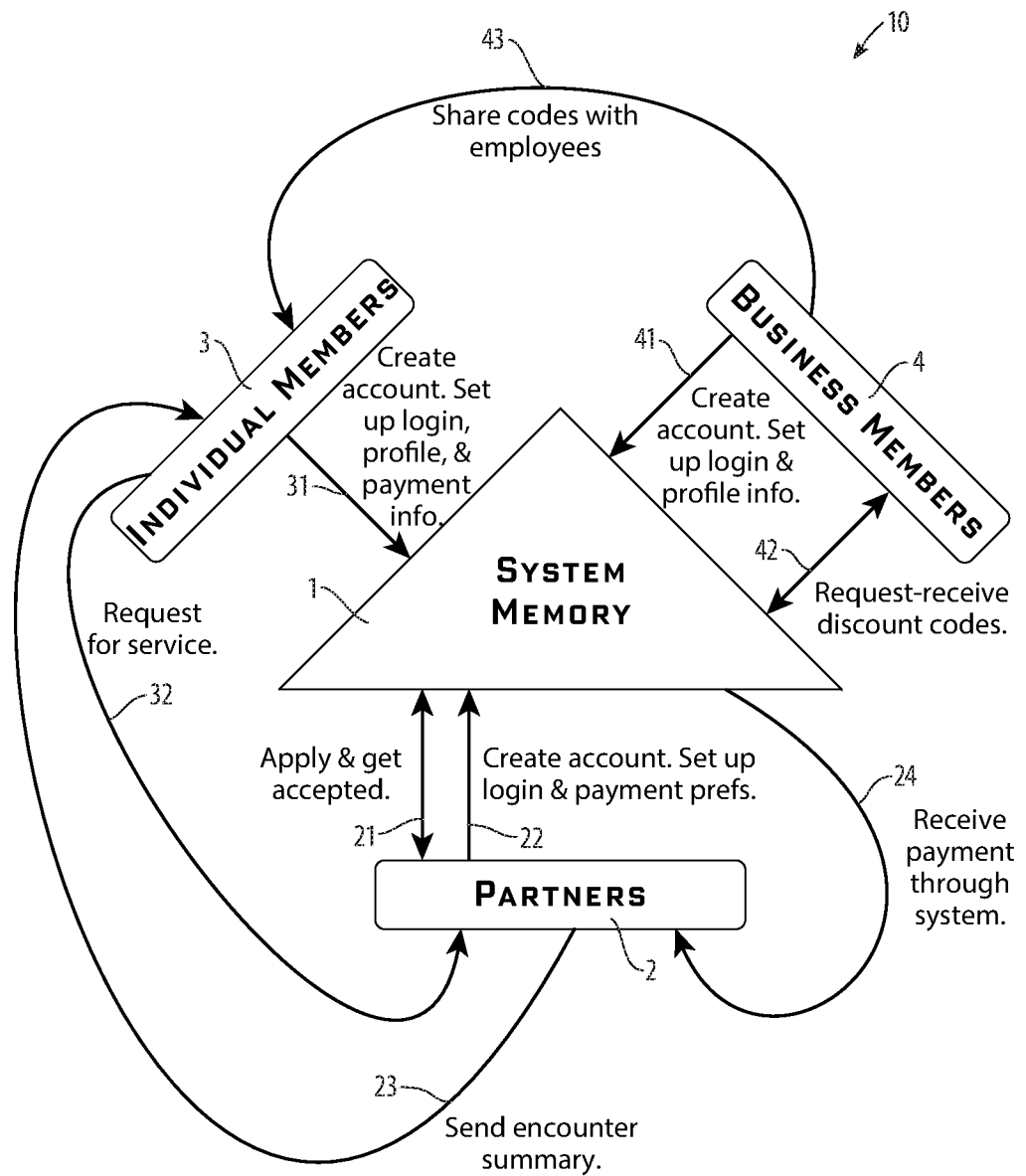
FIG. 1 is a flowchart of the standard embodiment of the subscription healthcare coverage system of the present invention.

Referring to FIG. 1 and all figures generally, the subscription healthcare coverage system and method 10 of the invention is shown.

The subscription healthcare coverage system 10 is implemented in a system memory 1 through which all communications, transactions, and exchange of money pass, with the vast majority of responses, decisions, charges, payments, scheduling, and other transactions being made by the application of defined rules to data securely stored and quickly accessible to system memory. This secure and quickly accessible storage provides for the quick initiation and conclusion of transactions over the communications infrastructure in place, such as the Internet, as well as over communications devices already owned by the majority of individuals, such as personal computers, tablets, and smartphones.

Transactions through these communications devices can be accomplished using an app, or application program, or by using a web-browser interface. Between the initiation and conclusion of transactions, decisions and other responses or actions are completed rapidly by the system memory 1, which is meant to be implemented on a digital computer or system of digital computers connected to a sufficient amount of data storage and a sufficient communications network. The present invention cannot be successfully practiced without the use of computer-based calculations, data storage, encryption-decryption, and communications, because only computer-based technology can provide the speed, volume, recording, and reporting necessary for such transactions.

Because the subscription healthcare coverage system and method 10 is based on healthcare information and transactions, an extremely high level of communications and data security is necessary in order to comply with laws and regulations covering healthcare information. The subscription healthcare coverage system and method 10 provides such communications and data security.

The subscription healthcare coverage system 10 comprises three broad categories of participants: partners 2, individual members 3, and business members 4.

The partners 2 can include any provider, business, or entity that offers healthcare services or goods. In the preferred embodiment of the present invention, the partners 2 do not pay to participate in the subscription healthcare coverage system 10. Partners 2 are, in turn, paid from money collected from the members 3, 4. Partnerships are approved through an online application process 21. After approval, each partner 2 creates an account 22, with login, profile, and payment preferences, for secure, controlled communication with and access to the appropriate functions of the system memory 1.

The individual members 3 are the persons or heads-of-household who seek and receive healthcare services.

The business members 4 are businesses that employ people and want to provide, in full or in part, healthcare coverage for its employees. An individual member 3 could be, but would not necessarily have to be, an employee of a business member 4 under the preferred model of the present invention.

The business members 4 join and create an account 41, with a login and profile information, for secure, controlled access to the appropriate functions of the system memory 1. The business members 4 can request and receive discount codes 42 from the system memory 1, and the business members 4 can then share the discount codes with the businesses employees 43. The employees having possession of a discount code can become or renew their status as an individual member 3, and, using the discount code, can be charged an appropriately reduced fee. In this way, the business member 4 can wholly or partially subsidize the healthcare coverage of the individual member 3.

The subscription healthcare coverage system and method 10 simplifies the over-complicated healthcare industry, while at the same time, making it a pleasant experience for everyone involved, including patients, providers, and administrators. The subscription healthcare coverage system and method promotes transparency, decreases costs, and increases quality & availability, by (A) eliminating premiums, deductibles, and copays, to be replaced only with flat membership fees, much like fitness clubs; (B) making all metrics available to consumers and providers, online and on the app in real time, without any complicated billing schemes; and (C) discouraging abuse of the system through healthy incentives for both consumers and providers.

Currently, the average yearly premiums of employer-sponsored family health insurance is just over $18,000.00, with workers paying around $5,300.00. These numbers do not include deductibles or copays, which bring the total cost per person (every man, woman, and child in the US) to over $10,000.00.

The subscription healthcare coverage system 10 will charge a flat membership fee of $500/month for individuals, and $800/month for families. Membership includes services and products from all participating entities, including hospitals, clinics, and pharmacies. No deductibles, copays, or additional charges for each visit, service, or prescription will be required. Consumers simply download the app, create an account with login, enter personal info for each member, as well as credit card or bank info, and so forth, and the coverage is thereafter in place for the consumer.

Providers must apply for partnership with the subscription healthcare coverage system 10 to ensure quality service for members, as well as a comfortable pay scale for the partners themselves. A target is to keep a ratio of approximately 1 partner per 100 members. The subscription healthcare coverage system will cover traditional medical procedures and practices, which means that providers who are offering elective services (such as abortions and sex-change therapy) that are not necessary for patient health and well-being will not be approved. If a provider is denied partnership solely due to the member-partner ratio, that entity will be placed on a waiting list and encouraged to invite patients to join, so that the ratio will shift and they can then partner. Partners are paid on the 1st & 15th day of each month through electronic funds transfer ("EFT") or bank draft, as is typical in automatic-payment systems.

The first payment will include the following calculation: Encounter payment, $En$=(Gross monthly membership fees, $GMF$−5% of $GMF$)×(Number of members served that month, $SM$/Total number of members that month, $TM$)×(Service constant for the encounter, $SC$).

First monthly payment, $P1$=Sum of all encounters, $E1+E2+E3 \ldots EN$.

Sample Service Constants may be as follows: (A) Nurse Visit—0.1; (B) Follow up/Mid-level visit—0.2; (C) Office Visit—0.3; (D) Testing & Interpretation (labs, x-rays, etc.)—0.4; (E) Minor Procedure—0.5; (F) Minor Surgery (local anesthesia)—0.6; (G) Minor Surgery (sedation) —0.7; (H) Major Surgery (general anesthesia)—0.8; (I) Overnight Stay—0.9; (J)>3 Night Stay—1.0.

For example, if a doctor's office serving 10 out of 1000 total members (for simplicity, all members are individual payers, and all encounters are office visits) in a single month, the calculation will look like this:

$$(GMF-5\%) \times (1/TM) \times (SC) = E1 = (\$500{,}000 - \$25{,}000) \times (1/1000) \times (0.3) = (\$475{,}000) \times (1/1000) \times (0.3) = \$142.50$$

$$E1+E2+E3+ \ldots E10 = P1 = \$142.50 + \$142.50 + 142.50 + \ldots \$142.50 = \$1{,}425.00$$

The 5% taken off the top of the calculation is the subscription healthcare coverage system's fee for providing the service. Hence, the first monthly payment (P1) for the example above is $1,425.00. Once all patient encounters have been paid out to providers, there will be a second round of payments for the remainder of the 95% of gross monthly income not associated with patient encounters. These payments will be determined by a second weighted system based on the complexity of the participant's entire business, practice, or specialty. Consequently, a hospital will receive a larger percentage than a family practice clinic, and so forth.

The second calculation will appear as follows:
(Remainder of 95%, R/Total number of providing entities, TP)×(Designated base constant, BC)=First calculation for second payment to provider, P2a; then repeated until the remainder of 95% is zero. $P2 = P2a + P2b + P2c + P2d \ldots$.

$$(R/TP) \times (BC) = P2a,\ P2b,\ \text{etc.} = P2.$$

Sample Clinical Physician Base Constant Chart:
Family/Internal Medicine—0.1
Endocrinology/Rheumatology—0.2
Infectious Disease—0.3
Cardiology—0.4

Using the same variables from the previous example, with the additional factors that there is 20% remaining from the original 95%, and there are 10 participating entities (1:100 member/partner ratio), the second calculation (for the family physician) is as follows: $(Ra/TP) \times (BC) = P2a = (\$95,000.00/10) \times (0.1) = \$950.00$.

For simplicity, assume all participants have a BC of 0.1; thus, all 10 getting $950 on P2a, for a total distribution of $(\$950.00) \times (10) = \$9,500.00$. Thus, $Rb = (\$95,000.00) - (\$9,500.00) = \$85,500.00$.

This leads to the following for P2b:

$$(Rb/TP) \times (BC) = P2b = (\$85,500.00/10) \times (0.1) = \$855.00$$

$$P2c = (\$76,950.00/10) \times (0.1) = \$769.50.$$

$$P2d = (\$69,255.00/10) \times (0.1) = \$692.55.$$

This continues until the entire remaining 95% is distributed: $P2 = P2a + P2b + P2c + P2d \ldots = \$950.00 + \$855.00 + \$769.50 + \$692.55 \ldots = \$9,500.00$.

As a result, the family physician with 10 office visits in the above example would be paid a sum of $1,425.00 on the first of the month for patient visits (P1), as well as $9,500.00 on the 15th of the month for partner distribution of the remaining funds (P2), for a total of $10,925.00. There is no lag time in the distribution of payments, as they are sent on the 1st and 15th for the previous month.

All information will be available online & through the app in real-time metrics. This availability and transparency will allow patients and providers to check on items such as upcoming appointments, locations of partners (with maps), number of visits in a given time (including a point system explained in the next section), payouts for each encounter, and so forth. Providers will eventually be given the option to utilize scheduling software provided by the app. To begin each patient encounter, the member will send a request to the partner via the app. At the end of each encounter, the provider will send an automated summary report back to the patient, which he or she will then acknowledge on his or her device. This records the encounter for the provider, associates a service constant (SC), and performs the encounter (E) calculation for payment. It also keeps track of the number of encounters, points acquired, and average points per member, which are crucial knowledge for fee adjustments at the end of each 12-month member cycle. These adjustments are explained further below.

Reasonable incentive measures for patients & partners will be established in order to prevent the overuse and abuse of medical services, a phenomenon currently unchecked within some governmental programs, such as Medicaid.

The first incentive is tracking the average number of encounters per year, and giving either a discount or an increase in the flat fee for the following year. Each encounter will be logged in real time, and total number of encounters can be viewed at any time. Also, there will be a metric that will provide the real time average number of encounters for all members in the app. At the end of my membership year, if the user's personal encounter average is greater than the total member average, that user will have a slight increase in his or her rate for the next membership year. Conversely, if his or her average is less, he or she will receive a discount.

As a second incentive, providers and participating entities will have 60 days from the time their application is approved to complete their first patient encounter. After 60 days, they will be expected to encounter at least 10 patients per month, or they will be dropped. This arrangement is simply a barrier to eliminate fraud from the partners' standpoint.

As a third incentive, membership discounts can be obtained by business members 4 and passed on to the businesses employees. Individual membership will be available to anyone at any time, regardless of employment, but some incentives for businesses who still want to provide benefits to their employees will be offered.

Individual members 3 flat rates will be adjusted every membership year according to a points system based on their number of encounters with partners 2. The adjustment will be made as compared to the average points of each individual member.

For example, if it is July 15 and the user has acquired 20 points through partner encounters, but the average points for all members is 15, then that user will be incentivized to avoid recordable encounters during the remainder of the year. Otherwise, that user may have an increase in its rate next year. The adjustment will be 1% in either direction for every 10 points above or below the average, but no more than 10% in 1 year. There is a 3-year cap on adjustments in one direction (which are always based on the original $500 or $800), so that each patient will pay no more or less than 30% of the original flat fee price. The Point System will mirror the Service Constant System, and will be recorded at the same time. For example, if the SC is 0.1, the member will acquire 1 point. If the SC is 0.2, the member will acquire 2 points, and so forth.

The subscription healthcare coverage system 10 does not require individual members to commit to long-term contracts, but asks individual members, in good faith, to remain with the system for at least one year between sign-up and cancellation. To minimize fly-by-nighters who will sign up for a particular service or procedure, then cancel once that service or procedure is performed, there is a 6-month waiting period for those who cancel within 12 months of sign-up, then later wish to rejoin. In addition, all first-time users pay 2 months of advance membership (instead of a deposit) to begin service. If someone cancels prior to 12 months, then returns after the 6-month waiting period, his or her initial payment will be 3 months advance membership. This payment amount will continue to increase by 1 month each time the user cancels, with the maximum being 12 months advanced payment.

Any legitimate business with greater than 10 employees will be allowed to create a business account and become a business member 4. To obtain discounts for employees, businesses will request a discount code for each employee on staff. This can be done at any time. Each employee will then receive their code. When the employee signs up on the app, he or she will be asked to enter the code, which will then apply the discount for 1 membership year. At the end of that year, the employer must request a new code for the following year, and so forth. The employee's account is still their own personal account, so the account does not terminate when they leave the job. However, when their year discount is up, they will either return to full price, or their new employer will have to request a new discount.

An example Employer Discount Schedule is:
10 employees or less—no discount;
11-50 employees—3% discount;
51-100 employees—5% discount;
101-200 employees—8% discount; and
>200 employees—10% discount.

Figure 2:
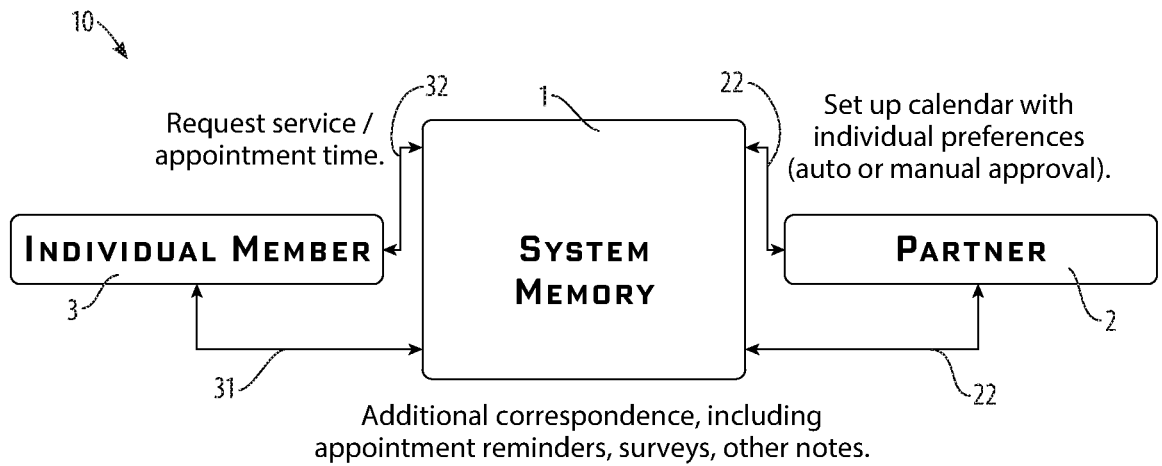
FIG. 2 is a flowchart of an appointment-scheduling embodiment of the subscription healthcare coverage system of the present invention.

Referring to FIG. 2, optionally, the subscription healthcare coverage system can be provided in an appointment-scheduling embodiment. Certain partners are able to use an individual calendar to schedule appointments 22. Since the calendar is on the app, the partner may allow members to view the calendar (minus all personal info/details) and request open appointment times 32 simultaneously with the "request for service" step. The partners will also have the option to set automatic functions including appointment reminders, cancelling and rescheduling, surveys 31.

Figure 3:
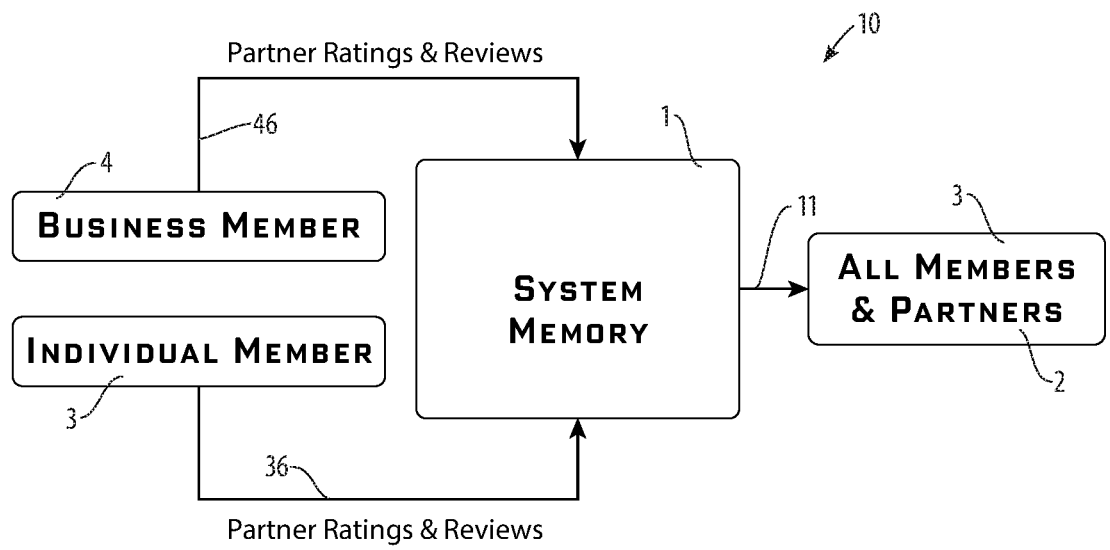
FIG. 3 is a flowchart of a ratings-reviews embodiment of the subscription healthcare coverage system of the present invention.

Referring to FIG. 3, optionally, the subscription healthcare coverage system can be provided in a ratings-reviews embodiment. Individual & Business members will be able to provide voluntary rating and review of partners 36, 46. Business input will be limited to whole company services, such as occupational medicine clinics. The results of such ratings and reviews can be made available to members and partners 11.

Figure 4:
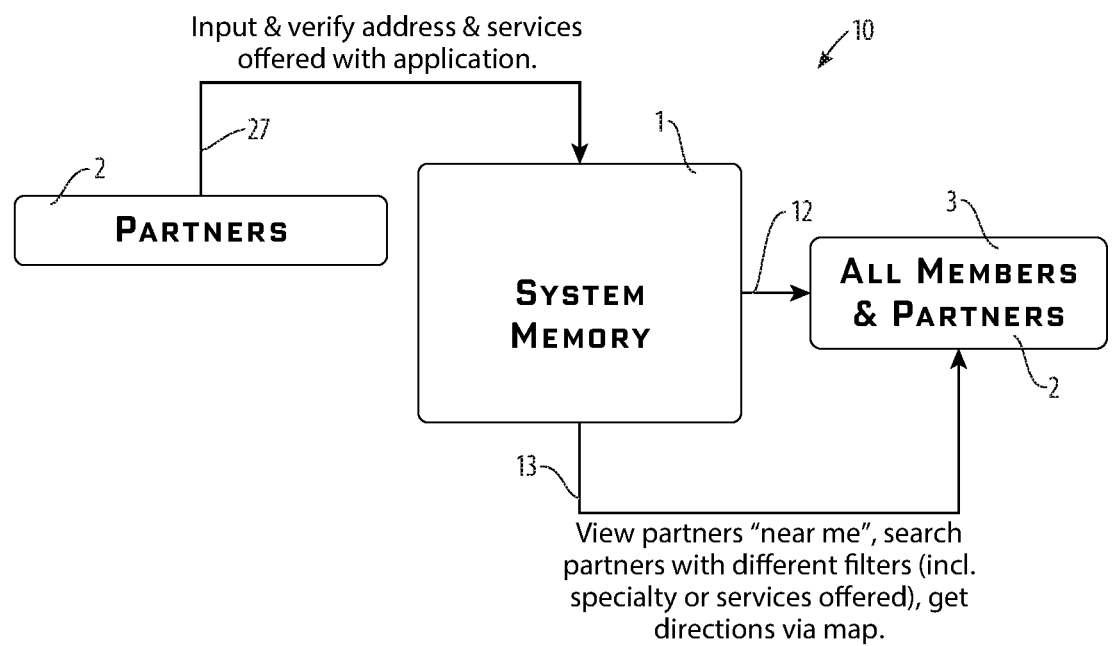
FIG. 4 is a flowchart of a maps-directions embodiment of the subscription healthcare coverage system of the present invention.

Referring to FIG. 4, optionally, the subscription healthcare coverage system can be provided in a maps-directions embodiment. All users will be able to view 13 a map of partner locations & services gathered from each partner's application information 27.

Figure 5:
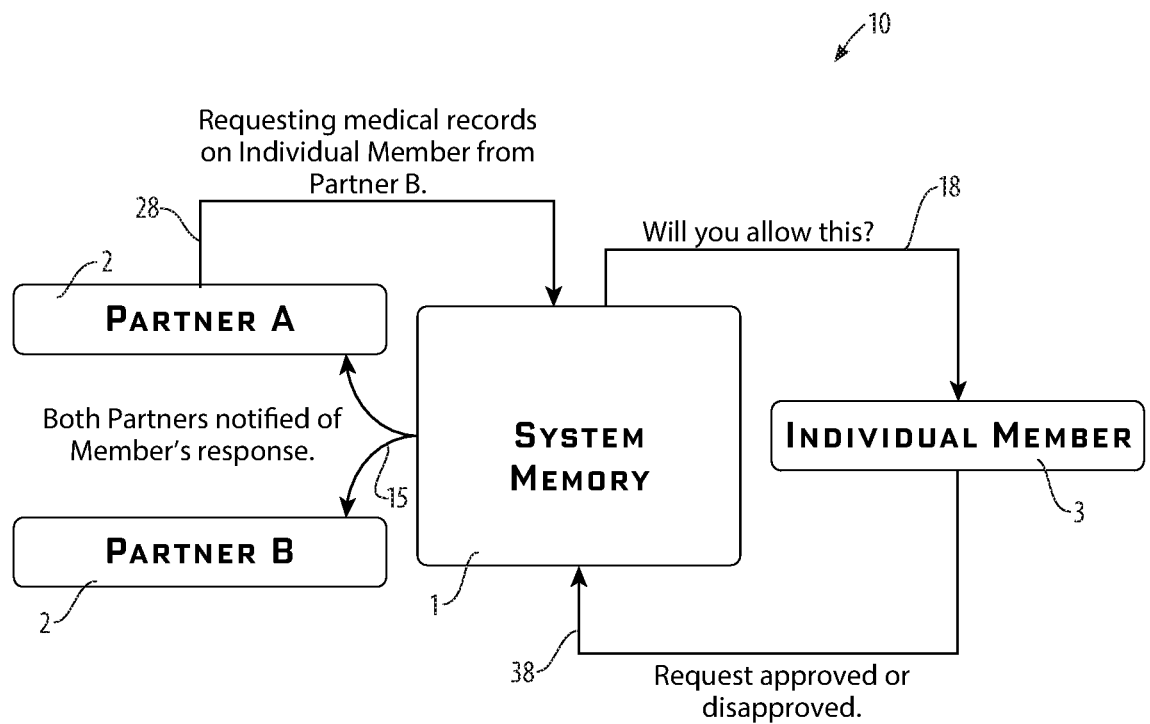
FIG. 5 is a flowchart of a records-request embodiment of the subscription healthcare coverage system of the present invention.

Referring to FIG. 5, optionally, the subscription healthcare coverage system can be provided in a medical records-request embodiment. A Partner 2 may request medical records 28 on Individual Members 3 from other Partners by having the request approved by the Individual Member 18, 38. This approval will serve as a signature for the Release of Information (ROI) forms that are currently used.

Many other changes and modifications can be made in the system and method of the present invention without departing from the spirit thereof. I therefore pray that my rights to the present invention be limited only by the scope of the appended claims.

I claim:

1. A subscription healthcare coverage system, comprising:
   (i) a system memory adapted to provide fast secure communications, secure data storage, and automated rules-based decision making;
   (ii) a plurality of system partners comprising accounts created by healthcare providers, said system partners in secure communication with said system memory;
   (iii) a plurality of system individual members comprising accounts created by insured persons and heads of households, said system individual members in secure communication with said system memory; and
   (iv) a plurality of system business members comprising accounts created by employers of some said individual members, said system business members in secure communication with said system memory;
   where, in use, healthcare providers desiring to become said system partners submit a secure online request, said system memory issues an approval or a disapproval indication based on application of a set of predetermined request rules to data, employers desiring to become said system business members submit a secure online business request, said system memory sets up a business-member account, through which said system business members can obtain a set of discount codes for issuance to employees, and persons desiring healthcare coverage securely communicate with said system memory and pay a flat rate, less any employee discount, to become said system individual members and to receive healthcare coverage; and
   where, in use, said system individual members can securely communicate requests for service to said system partners, and said system individual members can receive the desired healthcare in an encounter, after which said system partners issue an encounter summary, with said encounter summary featuring a set of encounter data, and communicate said encounter data to said system memory for use in calculating amounts of payment to said system partners and for use in calculating a set of predetermined renewal rates for said system individual members.

2. The subscription healthcare coverage system of claim 1, further comprising an appointment-scheduling embodiment.

3. The subscription healthcare coverage system of claim 1, further comprising a ratings-reviews embodiment.

4. The subscription healthcare coverage system of claim 1, further comprising a maps-directions embodiment.

5. The subscription healthcare coverage system of claim 1, further comprising a records-request embodiment.

6. The subscription healthcare coverage system of claim 1, where said system memory is implemented on a digital computer system.

7. The subscription healthcare coverage system of claim 1, where secure communications are conducted over an online computer system.

8. The subscription healthcare coverage system of claim 1, where secure communications are conducted through an app.

9. The subscription healthcare coverage system of claim 1, where secure communications are conducted over an interconnected network.

10. The subscription healthcare coverage system of claim 1, where a number of said system partners is maintained at a ratio of 1 said system partner for every 100 said system individual members.

11. A subscription healthcare coverage method, comprising:
   (i) providing a subscription healthcare coverage system, said system comprising:
      (a) a system memory adapted to provide fast secure communications, secure data storage, and automated rules-based decision making;
      (b) a plurality of system partners comprising accounts created by healthcare providers, said system partners in secure communication with said system memory;
      (c) a plurality of system individual members comprising accounts created by insured persons and heads of households, said system individual members in secure communication with said system memory; and
      (d) a plurality of system business members comprising accounts created by employers of some said individual members, said system business members in secure communication with said system memory; and
   (ii) using said subscription healthcare coverage system where, in use, healthcare providers desiring to become said system partners submit a secure online request, said system memory issues an approval or disapproval indication based on application of a set of predetermined request rules to data, employers desiring to become said system business members submit a secure online business request, said system memory sets up a business-member account, through which said system business members can obtain a set of discount codes for issuance to employees, and persons desiring healthcare coverage securely communicate with said system memory and pay a flat rate, less any employee discount, to become said system individual members and to receive healthcare coverage; and where, in use, said system individual members can securely communicate requests for service to said system partners, and said system individual members can receive the desired healthcare in an encounter, after which said system partners issue an encounter summary, with said encounter summary featuring a set of encounter data, and communicate said encounter data to said system memory for use in calculating amounts of payment to said system partners and for use in calculating a set of predetermined renewal rates for said system individual members.

12. The subscription healthcare coverage method of claim 11, where said subscription healthcare coverage system further comprises an appointment-scheduling embodiment.

13. The subscription healthcare coverage method of claim 11, where said subscription healthcare coverage system further comprises a ratings-review embodiment.

14. The subscription healthcare coverage method of claim 11, where said subscription healthcare coverage system further comprises a maps-directions embodiment.

15. The subscription healthcare coverage method of claim 11, where said subscription healthcare coverage system further comprises a records-request embodiment.

16. The subscription healthcare coverage method of claim 11, where said system memory is implemented on a digital computer system.

17. The subscription healthcare coverage method of claim 11, where secure communications are conducted over an online computer system.

18. The subscription healthcare coverage method of claim 11, where secure communications are conducted through an app.

19. The subscription healthcare coverage method of claim 11, where secure communications are conducted over an interconnected network.

20. The subscription healthcare coverage system of claim 11, where a number of said partners is maintained at a ratio of 1 said system partner for every 100 said system individual members.

* * * * *